United States Patent
Takahashi et al.

(10) Patent No.: US 7,027,090 B2
(45) Date of Patent: Apr. 11, 2006

(54) IMAGE INPUT DEVICE

(75) Inventors: Yoshio Takahashi, Ehime (JP); Fumio Fujimura, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 720 days.

(21) Appl. No.: 09/937,930

(22) PCT Filed: Feb. 2, 2001

(86) PCT No.: PCT/JP01/00737

§ 371 (c)(1),
(2), (4) Date: Nov. 30, 2001

(87) PCT Pub. No.: WO01/58142

PCT Pub. Date: Aug. 9, 2001

(65) Prior Publication Data
US 2002/0154229 A1 Oct. 24, 2002

(30) Foreign Application Priority Data
Feb. 3, 2000 (JP) .............................. 2000-026537

(51) Int. Cl.
*H04N 5/225* (2006.01)
*H04N 5/202* (2006.01)
*H04N 1/46* (2006.01)
*G03F 3/08* (2006.01)

(52) U.S. Cl. .................... 348/262; 348/254; 358/514; 358/519

(58) Field of Classification Search ............... 348/324, 348/218.1, 262, 263, 264, 265, 311, 254; 358/504, 514, 523, 519, 406, 482, 483; 257/234
See application file for complete search history.

(56) References Cited

U.S. PATENT DOCUMENTS

| 4,862,286 | A | * | 8/1989 | Suda et al. ................... 358/494 |
| 5,121,230 | A | * | 6/1992 | Honma et al. ............... 358/500 |
| 5,523,861 | A | * | 6/1996 | Tanaka et al. ............... 358/475 |
| 5,880,859 | A | * | 3/1999 | Hiromatsu ................... 358/514 |
| 6,069,973 | A | * | 5/2000 | Lin et al. ..................... 382/167 |
| 6,636,629 | B1 | * | 10/2003 | Sasai ........................... 382/167 |

FOREIGN PATENT DOCUMENTS

| EP | 268439 | 5/1988 |
| JP | 63-124672 | 5/1988 |
| JP | 1-139670 | 9/1989 |
| JP | 1-264058 | 10/1989 |
| JP | 2-254855 | 10/1990 |
| JP | 2-254864 | 10/1990 |
| JP | 8-8640 | 10/1990 |

(Continued)

*Primary Examiner*—Thai Tran
*Assistant Examiner*—Justin Misleh
(74) *Attorney, Agent, or Firm*—Wenderoth, Lind & Ponack, L.L.P.

(57) ABSTRACT

In an image input apparatus having an image sensor that is composed of plural chips, the stepwise difference in density on a chip boundary is made inconspicuous by a limited amount of compensation memory. The image input apparatus obtains the stepwise differences in density between pixels that are positioned in adjacent places to adjoining chips of the image sensor and for plural lines, averages the differences, reads an image, and displays the same on a screen after compensating for the stepwise difference in density between the chips for each line by using the average value.

17 Claims, 3 Drawing Sheets

FOREIGN PATENT DOCUMENTS

| | | |
|---|---|---|
| JP | 5-3546 | 1/1993 |
| JP | 6-78147 | 3/1994 |
| JP | 6-245067 | 9/1994 |
| JP | 9-154016 | 6/1997 |
| JP | 10-117277 | 5/1998 |
| JP | 10-164363 | 6/1998 |
| JP | 11-88673 | 3/1999 |

* cited by examiner $S = P_{322} - P_{323}$ $P_{323}' = P_{323} + S$ $P_{643}' = P_{643} + S$ $P_{644}' = P_{644} + S$ $$m_1 = \frac{(S_1 + S_2 + \cdots S_n)}{n}$$

$$m_2 = \frac{(S_1 + S_2 + \cdots S_n)}{n}$$

IMAGE INPUT DEVICE

TECHNICAL FIELD

The present invention relates to an image input apparatus and, more particularly, to a structure for effectively reducing stepwise differences in density between chips in an image sensor of an image scanner.

BACKGROUND ART

Conventionally, in an image scanner which requires a large image sensor for reading a relatively large object, such as a desktop type, plural chips of the same standard are arranged adjacently, and an image of the object is read by employing output signals from the respective chips. The image scanner having such a structure initially measures gamma characteristics for each chip and compensates each gamma compensation value for each corresponding chip when an image is inputted, thereby resolving manufacture variations among the respective chips so as to obtain a fine image.

However, when chip characteristics are varied due to changes over time or the like, it is necessary to measure and compensate the gamma characteristics on all such occasions. In addition, when there are different gamma characteristics within one chip, the effect appears in an image as the stepwise difference in density on the chip boundary, and such a case cannot be handled by this structure. Further, it is necessary to provide a number of memories on the scanner side to store gamma compensation values for the plural chips.

The conventional image input apparatus is constructed in this manner, and labor that is involved in the maintenance of the plural sensor chips for the compensation of gamma characteristics due to the secular change and the number of memories for storing gamma compensation values are necessary. Further, when there are different gamma characteristics within one chip, this cannot be handled, and as a result, a fine image cannot be obtained.

The present invention is made to solve the above-described problems. Accordingly, an object of the present invention is to provide an image input apparatus which does not require maintenance such as a gamma characteristics compensation of a sensor chip due to the secular change and which can perform the compensation of gamma characteristics within one chip.

SUMMARY OF THE INVENTION

According to a first aspect of the present invention, in an image input apparatus having an image reading unit which is constructed by arranging plural chips integrally, a stepwise difference in density between image signals which are respectively read by adjacent chips consisting of plural read pixels, which chips have different reading sensitivities, is successively calculated at a time of image reading, and the image signals which are respectively read by the adjacent chips are compensated such that the difference in density between the image signals is compensated.

According to a second aspect of the present invention, the image input apparatus of the first aspect has a gamma compensation value only for one chip from among the plural chips as a reference (reference chip), and compensates the image signals for the reference chip and other chips by employing the gamma compensation value.

According to a third aspect of the present invention, in accordance with the image input apparatus of the second aspect, the stepwise difference in density of the image signals between the adjacent chips is calculated for image data which has been subjected to the compensation of the image signals by employing the gamma compensation value, and the stepwise difference in density is uniformly added to chips except for the reference chip.

According to a fourth aspect of the present invention, in accordance with the image input apparatus of the second aspect, the stepwise difference in density of the image signals between the adjacent chips is calculated for image data which has been subjected to the compensation of the image signals by employing the gamma compensation value, and the stepwise difference in density is added to respective pixels in stages for chips except the reference chip from the end of the chips.

According to a fifth aspect of the present invention, in accordance with the image input apparatus of any one of the first through fourth aspects, in the calculation of the stepwise difference in density between the image signals, a difference of pixel data on the chip boundary is taken as the stepwise difference in density between the image signals.

According to a sixth aspect of the present invention, in accordance with the image input apparatus of the fifth aspect, in the calculation of the stepwise difference in density between the image signals, a mean of differences of pixel data on chip boundaries for several lines is taken as the stepwise difference in density between the image signals.

According to a seventh aspect of the present invention, in accordance with the image input apparatus of the sixth aspect, in the calculation of the stepwise difference in density between the image signals, in a case where the mean of the differences of the pixel data on the chip boundaries for several lines is calculated, the difference value is excluded from the calculation of the mean when the difference exceeds a threshold value.

According to an eighth aspect of the present invention, in accordance with the image input apparatus of the sixth aspect, in the calculation of the stepwise difference in density between the image signals, the calculation of the stepwise difference in density between the image signals is started after being delayed from the start of a real reading by the number of lines which are required for calculating the mean value of the stepwise differences in density between the image signals.

According to a ninth aspect of the present invention, in accordance with the image input apparatus of the eighth aspect, the calculated stepwise difference in density is added from a first line of read image data, and last lines of the image data, by the number of which lines the calculation of the stepwise difference in density has been delayed, are not processed.

According to a tenth aspect of the present invention, in accordance with the image input apparatus of the eighth aspect, the calculated stepwise difference in density is added from a first line of read image data, and last lines of the image data, by the number of which lines the calculation of the stepwise difference in density has been delayed, are subjected to addition with a lastly calculated stepwise difference in density.

According to an eleventh aspect of the present invention, in accordance with the image input apparatus of the eighth aspect, the calculated stepwise difference in density is added starting from a line of the read image data, delayed by the number of lines which are required for calculating the stepwise difference in density, and the lines from the start, by the number of which lines the calculation is delayed, are not processed.

According to a twelfth aspect of the present invention, in accordance with the image input apparatus of the eighth aspect, the calculated stepwise difference in density is added starting from a line of the read image data, delayed by the number of lines which are required for calculating the stepwise difference in density, and an initially calculated stepwise difference in density is added to the lines from the start by the number of which lines the calculation is delayed.

According to a thirteenth aspect of the present invention, in accordance with the image input apparatus of any one of the first through twelfth aspects, when a real-time screen display of an input image is performed, the screen display is performed from a line which has been subjected to the addition of the stepwise difference in density between the chips.

According to a fourteenth aspect of the present invention, in accordance with the image input apparatus of the thirteenth aspect, the calculated stepwise difference in density is added from a first one of the read lines, display is performed on a screen from the first line when the last several lines are not processed, and the last several lines which are not processed are not displayed on the screen.

According to a fifteenth aspect of the present invention, in accordance with the image input apparatus of the thirteenth aspect, when the calculated stepwise difference in density is added from a line which is delayed by several lines, the line which is delayed by the several lines to the last line are displayed on the screen.

According to a sixteenth aspect of the present invention, the image input apparatus of the first aspect comprises: a density stepwise difference correcting means for, when the calculated stepwise difference in density is compared to a predetermined threshold value and the calculated stepwise difference in density is larger than the threshold value, correcting the calculated stepwise difference in density.

According to a seventeenth aspect of the present invention, in accordance with the image input apparatus of the sixteenth aspect, the density stepwise difference correcting means makes the stepwise difference in density zero when the stepwise difference in density is larger than the threshold value, thereby correcting the calculated stepwise difference in density so as not to perform compensation of the stepwise difference in density between the image signals.

According to an eighteenth aspect of the present invention, in accordance with the image input apparatus of the sixteenth aspect, the density stepwise difference correcting means holds the stepwise difference in density at a predetermined value so as not to be larger than the threshold value when the stepwise difference in density is larger than the threshold value.

According to a nineteenth aspect of the present invention, in accordance with the image input apparatus of the sixteenth aspect, the density stepwise difference correcting means calculates the difference by increasing the number of lines of pixels in chips for calculating the stepwise differences in density when the stepwise difference in density is larger than the threshold value.

According to a twentieth aspect of the present invention, in accordance with the image input apparatus of the first aspect, the stepwise difference in density between the image signals in reading subsequent to the start of reading is compensated by employing a difference in density between the image signals, which difference is calculated at the start of reading.

According to a twenty-first aspect of the present invention, in accordance with the image input apparatus of the first aspect, prereading for intermittently reading a region is performed before reading is performed, and the stepwise difference in density between the image signals is compensated by employing the stepwise difference in density, which difference is calculated at the prereading.

According to a twenty-second aspect of the present invention, in accordance with the image input apparatus of the twenty-first aspect, the stepwise difference in density which is calculated at the prereading is calculated from a mean of all image data that is obtained in the prereading.

According to a twenty-third aspect of the present invention, in accordance with the image input apparatus of the twenty-first aspect, the stepwise difference in density which is calculated by the prereading is stored, and the stepwise difference in density between the image signals is compensated by employing the stored stepwise difference in density.

According to a twenty-fourth aspect of the present invention, in accordance with the image input apparatus of the twenty-first aspect, the stepwise difference in density between the image signals is compensated by applying, to a stepwise difference in density of an intermittent region which is not a target to be read, a stepwise difference in density of a region which has been read immediately before the target region, at the prereading.

As described above, according to an image input apparatus of the present invention, in an image input apparatus having an image reading unit which is constructed by arranging plural chips integrally, a stepwise difference in density between image signals that are respectively read by adjacent chips consisting of plural read pixels, which chips have different reading sensitivities, is successively calculated at the time of image reading, and the image signals which are respectively read by the adjacent chips are compensated such that the stepwise difference in density between the image signals is compensated. Therefore, the stepwise difference in density on the chip boundary resulting from changes over time or the difference of gamma characteristics within one chip can be made inconspicuous without making the user conscious.

Further, according to the image input apparatus of the present invention, the apparatus has a gamma compensation value only for one chip from among the plural chips as a reference chip, and compensates the image signals for the reference chip and other chips by employing the gamma compensation value. Therefore, it is required that the apparatus should hold only a gamma compensation value for one reference chip, there by saving necessary memory.

Further, according to the image input apparatus of the present invention, the stepwise difference in density of the image signals between the adjacent chips is calculated for image data which has been subjected to the compensation of the image signals by employing the gamma compensation value, and the stepwise difference in density is uniformly added to chips except for the reference chip. Therefore, the stepwise difference in density between the chips can be reduced by a simple operation.

Further, according to the image input apparatus of the present invention, the stepwise difference in density of the image signals between the adjacent chips is calculated for image data which has been subjected to the compensation of the image signals by employing the gamma compensation value, and the stepwise difference in density is added to respective pixels in stages for chips except the reference chip from the end of the chips. Therefore, even when a difference of the compensation values between the pixels which exist between the adjacent chips is large and the gamma characteristics greatly vary within one chip, the compensation is not performed excessively, and as a result, more natural compensation of gamma characteristics can be performed.

Further, according to the image input apparatus of the present invention, in the calculation of the stepwise difference in density between the image signals, the density stepwise difference calculation means takes a difference of pixel data on the chip boundary as the stepwise difference in density between the image signals. Therefore, the stepwise difference in density on the chip interface can be effectively resolved.

Further, according to the image input apparatus of the present invention, in the calculation of the stepwise difference in density between the image signals, a mean of differences of pixel data on chip boundaries for several lines is taken as the stepwise difference in density between the image signals. Therefore, a smoother compensation of the stepwise difference in density can be performed, and it can be expected to obtain a fine read image.

Further, according to the image input apparatus of the present invention, in the calculation of the stepwise difference in density between the image signals, in a case where a mean of differences of pixel data on chip boundaries for several lines is calculated, when the difference exceeds a threshold value, the difference value is excluded from the calculation of the mean. Thereby, an error of the mean value due to an abnormal value or the like can be reduced.

Further, according to the image input apparatus of the present invention, the apparatus comprises a density stepwise difference correcting means for, when the calculated stepwise difference in density is compared to a predetermined threshold value and the calculated stepwise difference in density is larger than the threshold value, correcting the calculated stepwise difference in density. Therefore, there can be provided an image input apparatus with high reliability, without using a stepwise difference in density resulting from miscalculation for the compensation of characteristics between the chips.

Further, according to the image input apparatus of the present invention, a stepwise difference in density is calculated at prescanning which is performed before real scanning, and the stepwise difference in density is used for compensating image signals at the real scanning. Therefore, the processing at the real scanning can be sped up.

DETAILED DESCRIPTION OF THE INVENTION

First Embodiment

Hereinafter, an image input apparatus according to a first embodiment of the present invention will be described.

Figure 1:
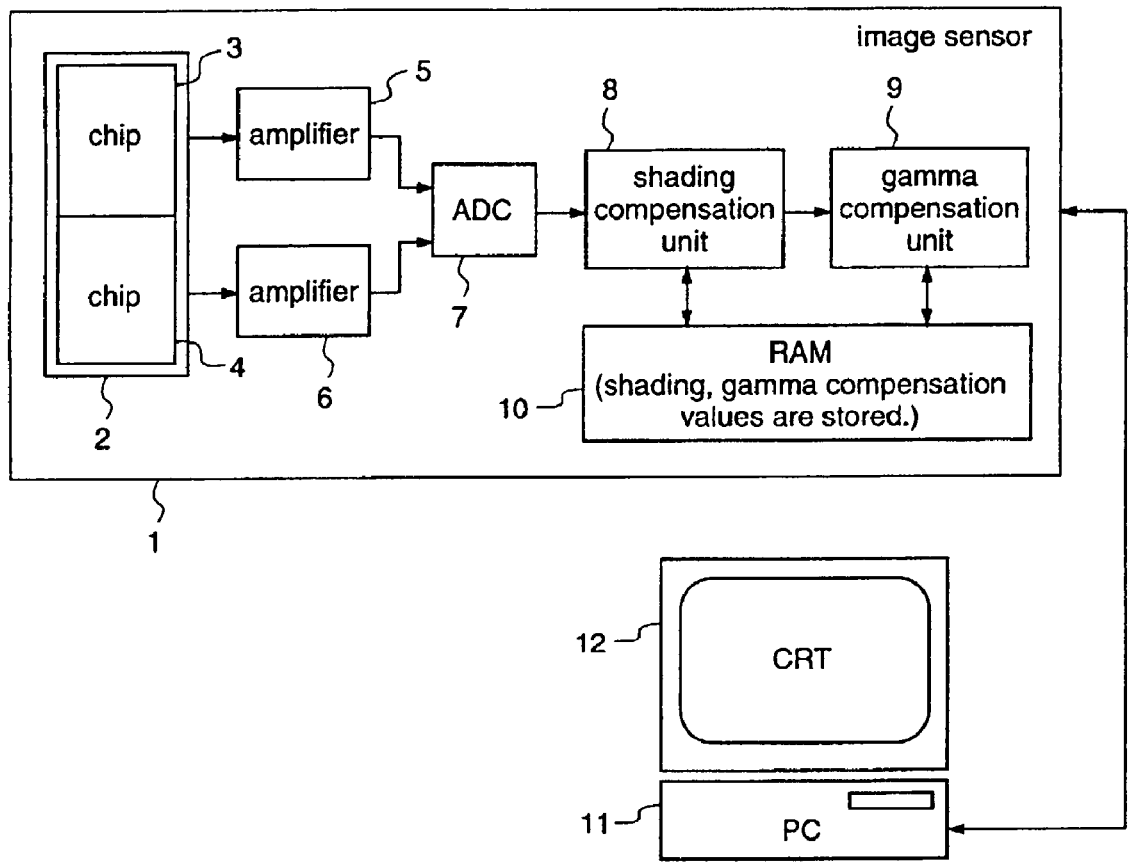
FIG. 1 is a diagram illustrating a structure of an image input apparatus according to a first embodiment of the present invention.
Figure 2:
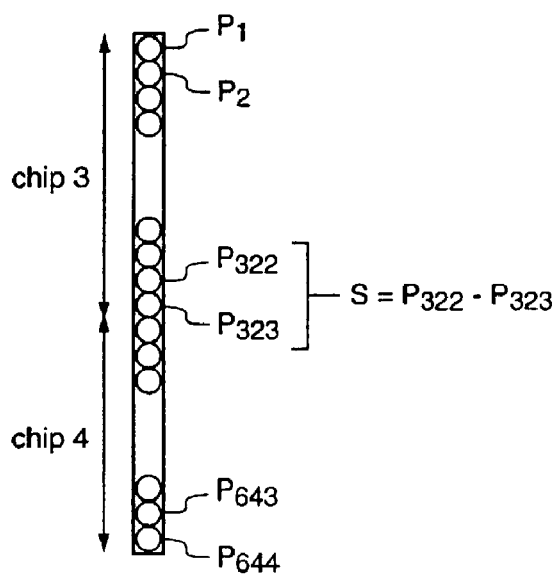
FIGS. 2(a) to 2(b) are diagrams for explaining a method for calculating the stepwise difference in density by the image input apparatus.
Figure 2:
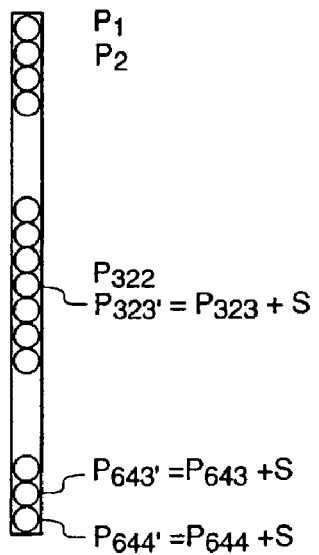
Figure 3:
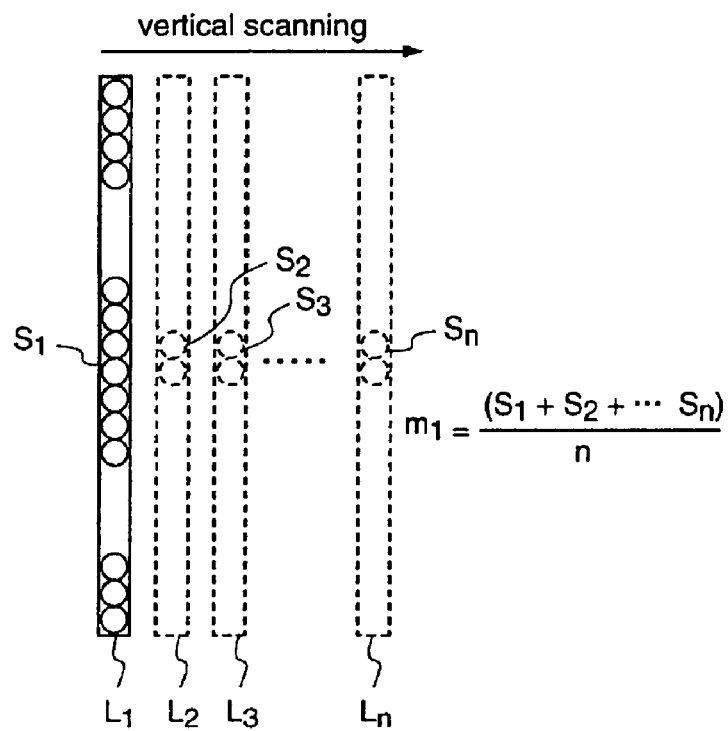
FIGS. 3(a) to 3(d) are diagrams for explaining a method in a case where the stepwise differences in density are averaged and an average difference is uniformly added to chips by the image input apparatus.
Figure 3:
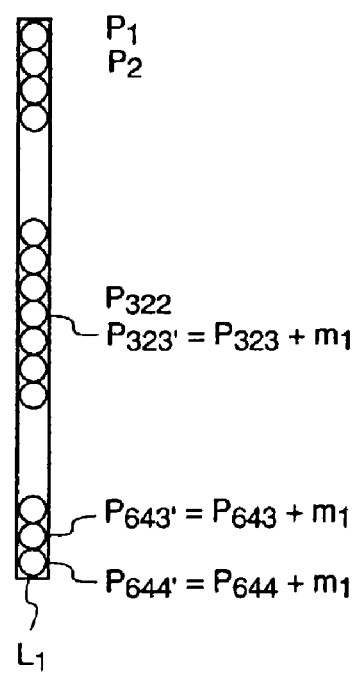
Figure 3:
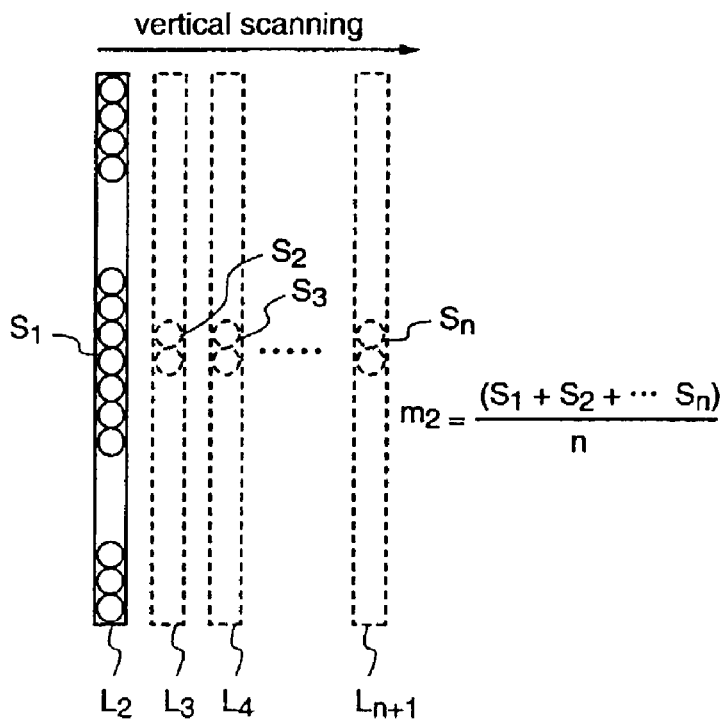
Figure 3:
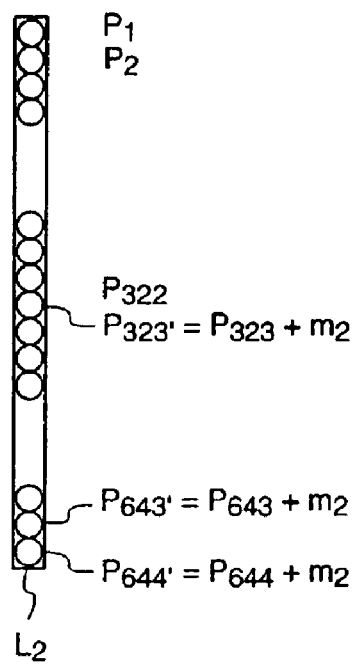
Figure 4:
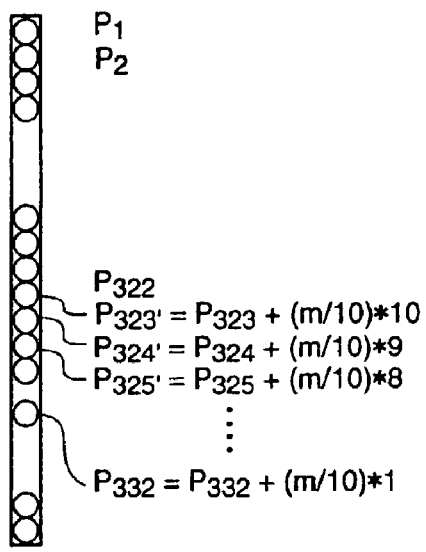
FIG. 4 is a diagram for explaining a method in a case where the stepwise differences in density are averaged and an average difference is added to chips in stages by the image input apparatus.

FIG. 1 is a block diagram of the image input (reading) apparatus according to the first embodiment. In FIG. 1, numeral 1 denotes an image scanner, and numeral 11 denotes a personal computer (PC) for compensating for a stepwise difference in density, where the PC 11 realizes a density stepwise difference calculating means and a density stepwise difference compensating means. Numeral 12 denotes a display apparatus (CRT) for displaying a read image.

Further, an image sensor 2 constituting the image scanner 1 consists of a first chip 3 and a second chip 4, which are arranged side by side in a direction that is orthogonal to the scanning direction, and first and second amplifiers 5 and 6 which amplify and output the outputs from the first and second chips 3 and 4, respectively.

The outputs of the first and second amplifiers 5 and 6 are converted into digital data by an ADC (analog-digital converter) 7 in the latter stage. A shading compensation unit 8 performs a shading compensation for the digital-converted data by using a shading coefficient of a RAM 10, and further, a gamma compensation unit 9 performs gamma compensation by using a gamma coefficient of the RAM 10.

Thereafter, the data is transferred to the PC 11, the density stepwise difference compensation is performed in the PC 11. Then, the read-in image is displayed on the CRT 12.

The operation of the image input apparatus according to the first embodiment will now be described with reference to FIGS. 1 to 4.

Initially, one of the first and second chips 3 and 4 is used as the reference chip, and a gamma compensation value of the chip is stored in the RAM 10. For example, when the first chip 3 is used as the reference chip, the gamma compensation value of the first chip 3 is stored in the RAM 10, and the gamma compensation unit 9 performs gamma compensation for both of the first and second chips 3 and 4 by using the gamma compensation value of the first chip 3 which is stored in the RAM 10.

Next, a stepwise difference in density is calculated from pixel data on the boundary after performing the gamma compensation for the first and second chips 3 and 4. In FIG. 2(a), assume that 322 pixels from $P_1$ to $P_{322}$ line up in the first chip 3, and 322 pixels from $P_{323}$ to $P_{644}$ line up in the adjacent second chip 4, that is, 644 pixels in total line up. Boundary pixels of the first and second chips 3 and 4 are the pixel $P_{322}$ and the pixel $P_{323}$, and a density stepwise difference S between the first and second chips 3 and 4 is obtained by the following Formula (1).

$$S = P_{322} - P_{323} \qquad \text{Formula (1)}$$

Further, as shown in FIG. 2(b), the calculated stepwise difference S in density is uniformly added to the pixels $P_{323}$ to $P_{644}$ according to Formula (2), so that the stepwise difference in density between the chips can be made inconspicuous.

$$P_{323'} = P_{323} + S \qquad \text{Formula (2)}$$
$$P_{324'} = P_{324} + S$$
$$\cdot$$
$$\cdot$$
$$P_{644'} = P_{644} + S$$

Further, when the stepwise difference in density is calculated only by the read pixels $P_{322}$ and $P_{323}$, there is a case where a correct stepwise difference in density cannot be calculated due to the influence of noise. Further, since $P_{322}$ and $P_{323}$ are disposed individually, there are deviations in the physical read positions, and as a result, the stepwise difference in density originally existing on a manuscript may be calculated as the stepwise difference in density between the chips.

Then, the stepwise differences in density are calculated on several lines by vertical scanning, and the calculated stepwise differences are averaged, thereby reducing an error in the calculation results. In FIG. 3(a), for example, when the number of lines for calculating a mean value is n, the respective density stepwise differences $S_1$–$S_n$ of the lines $L_1$–$L_n$ are calculated by the Formula (1), thereby obtaining a mean value by the following Formula (3) on the basis of this result.

$$m_1 = (S_1 + S_2 + \ldots + S_n)/n \qquad \text{Formula (3)}$$

The mean value $m_1$, as the obtained result, is uniformly added to the pixels $P_{323}$ to $P_{644}$ as shown in FIG. 3(b). With respect to the next line $L_2$, a mean value $m_2$ of the stepwise differences in density of the lines $L_2$ to $L_{n+1}$ is calculated as shown in FIG. 3(c), and the mean value $m_2$, as the obtained result, is uniformly added to the pixels $P_{323}$ to $P_{644}$ as shown in FIG. 3(d). In this way, with respect to all of the lines, a mean value of the stepwise differences in density of n lines starting from a target line is obtained, and the mean value is added to a density value of the target line.

Here, in a case where there are excessive stepwise differences in density in some lines, the mean value of the stepwise differences in density is compared with a predetermined value or the like, and as a result, no addition is performed when the mean value of the stepwise differences in density is calculated, thereby enhancing the accuracy of a density stepwise difference compensation.

Further, as another addition method for adding the value of the stepwise difference in density to one chip so as to compensate for the stepwise difference in density, there is a method by which the value is added in stages over several pixels of the second chip 4. As an example, a method by which the value is added in stages for 10 pixels, assuming that the second chip 4 is composed of 10 pixels, will be described with reference to FIG. 4.

As described above, the mean value m is calculated, and this calculated mean value m is added to the pixels $P_{323}$ to $P_{332}$ with decreasing a value (a compensation value) in stages from the pixel $P_{323}$ to the pixel $P_{332}$. By performing the compensation according to this method, for example even when the difference of the gamma characteristics of the pixels which are close to the boundary between the adjacent chips is large, variations of the gamma characteristics within one chip are small, and an excessive compensation is not performed when a value to be compensated of a pixel in a slightly distant position is smaller than that of a pixel existing on the chip boundary, and as a result, the compensation process can be performed in stages in a natural manner. When this is formulated, 10 pixels from the pixel $P_{323}$ to the pixel $P_{332}$ are represented by the following Formula (4).

$$P_{323'} = P_{323} + (m/10) * 10 \qquad \text{Formula (4)}$$
$$P_{324'} = P_{324} + (m/10) * 9$$
$$\vdots$$
$$P_{332'} = P_{332} + (m/10) * 1$$

In order to calculate a mean of the stepwise differences in density as described above, the compensation process for a target line should be performed with being delayed by n lines which are required to calculate the mean. When this process is performed, the last n lines are used only for obtaining the mean, and thus the mean of the stepwise differences in density of the target line cannot be calculated. Then, a processing, such as abandoning data of the last n lines even when the data are read, adding the same value as the mean value m which is most recently calculated before the process is performed to the last n lines, or decreasing the number of lines whose mean is calculated in stages, is performed.

Further, when the mean value m for the first n lines is added to $L_n$, contrary to the above-described method, a mean of the stepwise differences in density for the first n lines cannot be calculated. Then, it is possible that data of the first n lines are abandoned, the same value as the mean value m which is initially calculated as a mean of the stepwise differences in density is added to each of the first n lines, or the number of lines whose mean is calculated is increased in stages up to line n.

In a case where a read image is displayed on a screen in real time by employing an image reading apparatus which comprises the above-described structure for performing the density stepwise difference compensation process, data is displayed successively from a line for which the density stepwise difference compensation process has been completed, and as a result, reading of the image can be performed without making the user conscious of the density stepwise difference compensation process.

Further, also with respect to the display image, as described above, when the first n lines are abandoned, the first n lines are not displayed, and conversely, when the last n lines are abandoned, the last n lines are not displayed.

By performing the processing as described above, the stepwise difference in density between the chips can be made inconspicuous by a limited amount of memory without the maintenance for the density stepwise difference compensation which should be performed by the user.

As described above, according to the first embodiment, the stepwise difference in density between pixels which are positioned in adjacent places to the adjoining chips 3 and 4 of the image sensor is obtained for plural lines and averaged, the stepwise difference in density between the chips is compensated for each line by employing each of the obtained mean values, and thereafter, the image is read. Therefore, it is only required to provide a memory that holds the gamma compensation value for one chip as the reference for the density stepwise difference compensation, thereby suppressing an increase in the memory. Further, the density stepwise difference between the chips can be always compensated for regardless of the secular change without requiring action by the user. In addition, variations of the gamma characteristics within one chip can be also compensated, and as a result, a good read-in result can be obtained.

Further, the compensation value is varied in stages according to the number of adjacent pixels for the chips except for a chip as the reference, thereby compensating the stepwise difference in density more naturally.

Second Embodiment

An image input apparatus according to a second embodiment of the present invention will now be described.

Figure 5:
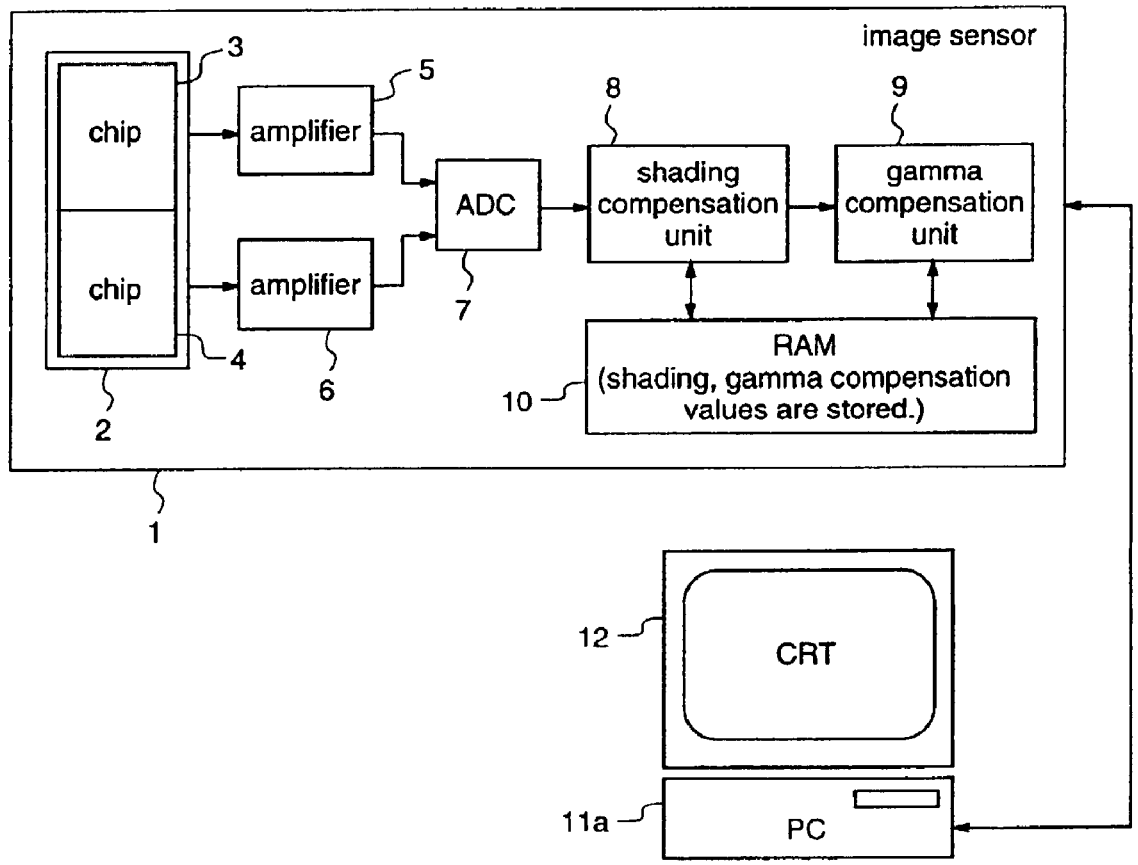
FIG. 5 is a diagram illustrating a structure of an image input apparatus according to a second embodiment of the present invention.

FIG. 5 is a block diagram of the image input apparatus according to the second embodiment of the present invention. In FIG. 5, numeral 11a denotes a PC (personal computer) which realizes a density stepwise difference correcting means as well as the density stepwise difference calculating means and the density stepwise difference compensating means.

Hereinafter, the operation of the image input apparatus of the second embodiment will be described. While the basic operation of the image input apparatus of the second embodiment is the same as that of the first embodiment, the mean of the stepwise differences in density is calculated by using Formula 3, and thereafter, it is judged whether or not the calculated density stepwise difference exceeds a predetermined value in the PC 11a having the density stepwise difference correcting means. When the calculated value exceeds the predetermined value, it is judged that the value is obtained as a result of a miscalculation or other factors, and the compensation amount is corrected to an appropriate value.

What is first considered as the cause of this miscalculation is a case where the calculated-density stepwise difference is one which originally exists on the manuscript. In this case, the density stepwise difference is corrected to 0 and the compensation is not performed.

What is secondly considered is a case where the calculated density stepwise difference is generated due to the influence of noise or the like. In this case, the density stepwise difference is corrected to the same value as a prescribed value, and the image deterioration that is caused by performing compensation with a larger value than the prescribed value is prevented. Further, the number of lines for calculating the mean is increased and the calculation is performed again. Accordingly, the error in the calculation results is reduced, thereby preventing the image deterioration.

By performing the processing as described above, an unnecessary compensation is prevented from being performed because of a stepwise difference in density due to miscalculation, which causes the image deterioration.

Third Embodiment

An image input apparatus according to a third embodiment of the present invention will now be described.

In the third embodiment, the calculated difference in density is employed at the start of reading, and the compensation of image signals in subsequent readings following the initial reading is performed.

That is, a difference of characteristics in each chip does not vary during the reading operation, and thus, after the density stepwise difference in each chip is calculated at the start of reading, the image signals which are thereafter read can be compensated for by using the calculated value.

As described above, the stepwise difference in density which is calculated at the start of reading is employed for image signal compensation at the time of subsequent reading processes, thereby increasing a processing speed as compared with the method by which the stepwise difference in density is calculated in real time for each read line to perform the compensation of the image signals.

Fourth Embodiment

An image input apparatus according to a fourth embodiment of the present invention will now be described.

In the fourth embodiment, assume that a reading process is performed at high speed before reading data with degrading the resolution as compared with a real reading, that is, the so-called prescanning process is performed. This prescanning process is a known process which is normally performed for deciding a read range of image data before actually reading the image. In the image input apparatus having such a prescanning function, the stepwise difference in density is previously calculated at the prescanning, whereby it can be expected to increase the processing speed at real scanning.

Here, in the prescanning, in contrast to the real scanning, all image data are not read but the image data are thinned and read. Therefore, the mean of the density stepwise differences of the respective lines, which differences are calculated at the prescanning, is calculated, and at real scanning the compensation is performed only by that value.

Further, the density stepwise differences of the respective lines, which differences are calculated at the prescanning, are stored in a storage device (here, PC 11 or PC 11a), and the compensation is performed at the real scanning by the stored density stepwise differences of the respective lines. At this time, since the stored density stepwise differences are the ones for the image data which have been thinned for the prescanning, the calculated density stepwise differences themselves are also in a thinned state. Thus, in a part having no data, that is, in a region where image data are thinned (practically in line units), the compensation is performed with reference to data of the immediately preceding line.

As described above, according to the fourth embodiment, the stepwise difference in density between the chips is calculated at the prescanning and employed at the real scanning, thereby increasing the processing speed at the real scanning.

INDUSTRIAL AVAILABILITY

A stepwise difference in density between image sensors in an image scanner is reduced by simple arithmetic, thereby providing an image scanner which performs a maintenance processing resulting from the secular change of image sensor chips without requiring action from the user and which does not require a large amount of memory for gamma compensation.

The invention claimed is:

1. An image input apparatus comprising an image reading unit which is constructed by arranging a plurality of chips integrally, wherein:

said image input apparatus is operable to successively calculate, at a time of image reading, a stepwise difference in density between image signals which are respectively read by adjacent chips of said image reading unit, wherein the plurality of chips each comprise a plurality of read pixels and have different reading sensitivities;

said image input apparatus compensates the image signals which are respectively read by the adjacent chips such that the difference in density between the image signals is compensated;

said image input apparatus has a gamma compensation value for only one chip, from among the plurality of chips, to be used as a reference chip; and said image input apparatus compensates the image signals for the plurality of chips by employing the gamma compensation value of the reference chip.

2. The image input apparatus according to claim 1, wherein said image input apparatus calculates the stepwise difference in density of the image signals between the adjacent chips for image data which has been compensated by employing the gamma compensation value of the reference chip, and said image input apparatus uniformly adds the stepwise difference in density to the plurality of chips except for the reference chip.

3. The image input apparatus according to claim 1, wherein said image input apparatus calculates the stepwise difference in density of the image signals between the adjacent chips for image data which has been compensated by employing the gamma compensation value of the reference chip, and said image input apparatus adds the stepwise difference in density to the plurality of read pixels in stages for the plurality of chips except for the reference chip from an end of the plurality of chips.

4. An image input apparatus comprising an image reading unit which is constructed by arranging a plurality of chips integrally, wherein:

said image input apparatus is operable to successively calculate, at a time of image reading, a stepwise difference in density between image signals which are respectively read by adjacent chips of said image reading unit, wherein the plurality of chips each comprise a plurality of read pixels and have different reading sensitivities;

said image input apparatus is operable compensates the image signals which are respectively read by the adjacent chips such that the difference in density between the image signals is compensated; and in the calculation of the stepwise difference in density between the image signals, said image input apparatus takes a difference of pixel data on a chip boundary as the stepwise difference in density between the image signals, takes a mean of differences of pixel data on chip boundaries for several lines as the stepwise difference in density between the image signals, and when the mean of the differences of the pixel data on the chip boundaries for several lines is calculated, excludes a value of the difference from the calculation of the mean when the difference exceeds a threshold value.

5. An image input apparatus comprising an image reading unit which is constructed by arranging a plurality of chips integrally, wherein:

said image input apparatus is operable to successively calculate, at a time of image reading, a stepwise difference in density between image signals which are respectively read by adjacent chips of said image reading unit, wherein the plurality of chips each comprise a plurality of read pixels and have different reading sensitivities;

said image input apparatus compensates the image signals which are respectively read by the adjacent chips such that the difference in density between the image signals is compensated;

in the calculation of the stepwise difference in density between the image signals, said image input apparatus takes a difference of pixel data on a chip boundary as the stepwise difference in density between the image signals, takes a mean of differences of pixel data on chip boundaries for several lines as the stepwise difference in density between the image signals, and starts the calculation of the stepwise difference in density between the image signals after the calculation is delayed from a start of a real reading by the number of lines which are required for calculating the mean value of the stepwise differences in density between the image signals.

6. The image input apparatus according to claim 5, wherein said image input apparatus adds the calculated stepwise difference in density from a first line of read image data, and does not process a number of last lines of the read image data for which the calculation of the stepwise difference in density has been delayed.

7. The image input apparatus according to claim 5, wherein said image input apparatus adds the calculated stepwise difference in density from a first line of read image data, and subjects a number of last lines of read image data for which the calculation of the stepwise difference in density has been delayed to addition with a lastly calculated stepwise difference in density.

8. The image input apparatus according to claim 5, wherein said image input apparatus adds the calculated stepwise difference in density starting from a line of the read image data, delays the calculated stepwise difference in density by the number of lines which are required for calculating the stepwise difference in density, and does not process a number of lines from the start of the read image data for which the calculation is delayed.

9. The image input apparatus according to claim 5, wherein said image input apparatus adds the calculated stepwise difference in density starting from a line of the read image data, delays the calculated stepwise difference in density by the number of lines which are required for calculating the stepwise difference in density, and adds an initially calculated stepwise difference in density to a number of lines for which the calculation is delayed from the start.

10. An image input apparatus comprising an image reading unit which is constructed by arranging a plurality of chips integrally, wherein:

said image input apparatus is operable to successively calculate, at a time of image reading, a stepwise difference in density between image signals which are respectively read by adjacent chips of said image reading unit, wherein the plurality of chips each comprise a plurality of read pixels and have different reading sensitivities;

said image input apparatus compensates the image signals which are respectively read by the adjacent chips such that the difference in density between the image signals is compensated; and when a real-time screen display of an input image is performed, said image input apparatus performs the screen display from a line which has been subjected to the addition of the stepwise difference in density between the plurality of chips.

11. The image input apparatus according to claim 10, wherein said image input apparatus adds the calculated stepwise difference in density from a first one of the read lines, performs a display on a screen from the first line when the last several lines are not processed, and does not display on the screen the last several lines which are not processed.

12. The image input apparatus according to claim 10 wherein, when the calculated stepwise difference in density is added from a line which is delayed by several lines, said image input apparatus displays on the screen the line which is delayed by the several lines to the last line.

13. An image input apparatus comprising an image reading unit which is constructed by arranging a plurality of chips integrally, wherein:
   said image input apparatus is operable to successively calculate, at a time of image reading, a stepwise difference in density between image signals which are respectively read by adjacent chips of said image reading unit, wherein the plurality of chips each comprise a plurality of read pixels and have different reading sensitivities;
   said image input apparatus is compensates the image signals which are respectively read by the adjacent chips such that the difference in density between the image signals is compensated;
   said image input apparatus further comprises density stepwise difference correcting means for correcting, when the calculated stepwise difference in density is compared to a predetermined threshold value and the calculated stepwise difference in density is larger than the threshold value, the calculated stepwise difference in density; and
   when the stepwise difference in density is larger than the threshold value, said density stepwise difference correcting means makes the stepwise difference in density zero so as to correct the calculated stepwise difference in density without performing compensation of the stepwise difference in density between the image signals.

14. An image input apparatus comprising an image reading unit which is constructed by arranging a plurality of chips integrally, wherein:
   said image input apparatus is operable to successively calculate, at a time of image reading, a stepwise difference in density between image signals which are respectively read by adjacent chips of said image reading unit wherein the plurality of chips each comprise a plurality of read pixels and have different reading sensitivities;
   said image input apparatus compensates the image signals which are respectively read by the adjacent chips such that the difference in density between the image signals is compensated;
   said image input apparatus further comprises density stepwise difference correcting means for correcting, when the calculated stepwise difference in density is compared to a predetermined threshold value and the calculated stepwise difference in density is larger than the threshold value, the calculated stepwise difference in density; and
   when the stepwise difference in density is larger than the threshold value said density stepwise difference correcting means holds the stepwise difference in density at a predetermined value so as not to be larger than the threshold value.

15. An image input apparatus comprising an image reading unit which is constructed by arranging a plurality of chips integrally, wherein:
   said image input apparatus is operable to successively calculate, at a time of image reading, a stepwise difference in density between image signals which are respectively read by adjacent chips of said image reading unit, wherein the plurality of chips each comprise a plurality of read pixels and have different reading sensitivities;
   said image input apparatus compensates the image signals which are respectively read by the adjacent chips such that the difference in density between the image signals is compensated;
   said image input apparatus further comprises density stepwise difference correcting means for correcting, when the calculated stepwise difference in density is compared to a predetermined threshold value and the calculated stepwise difference in density is larger than the threshold value, the calculated stepwise difference in density; and
   when the stepwise difference in density is larger than the threshold value, said density stepwise difference correcting means calculates the difference by increasing the number of lines of pixels in chips for calculating the stepwise differences in density.

16. An image input apparatus comprising an image reading unit which is constructed by arranging a plurality of chips integrally, wherein:
   said image input apparatus is operable to successively calculate, at a time of image reading, a stepwise difference in density between image signals which are respectively read by adjacent chips of said image reading unit, wherein the plurality of chips each comprise a plurality of read pixels and have different reading sensitivities;
   said image input apparatus compensates the image signals which are respectively read by the adjacent chips such that the difference in density between the image signals is compensated;
   said image input apparatus performs prereading for intermittently reading a region before reading is performed;
   said image input apparatus compensates the stepwise difference in density between the image signals by employing the stepwise difference in density which is calculated at the prereading; and
   said image input apparatus calculates the stepwise difference in density which is calculated at the prereading from a mean of all image data obtained in the prereading.

17. An image input apparatus comprising an image reading unit which is constructed by arranging a plurality of chips integrally, wherein:
   said image input apparatus is operable to successively calculate, at a time of image reading, a stepwise difference in density between image signals which are respectively read by adjacent chips of said image reading unit, wherein the plurality of chips each comprise a plurality of read pixels and have different reading sensitivities;
   said image input apparatus compensates the image signals which are respectively read by the adjacent chips such that the difference in density between the image signals is compensated;
   said image input apparatus performs prereading for intermittently reading a region before reading is performed;
   said image input apparatus compensates the stepwise difference in density between the image signals by employing the stepwise difference in density which is calculated at the prereading; and
   said image input apparatus compensates, at the prereading, the stepwise difference in density between the image signals by applying a stepwise difference in density of an intermittent region which is not a target to be read, and a stepwise difference in density of a region which has been read immediately before the target region.

* * * * *